No. 758,482. PATENTED APR. 26, 1904.
E. F. SMITH.
HANDLE.
APPLICATION FILED FEB. 11, 1902. RENEWED MAR. 31, 1904.
NO MODEL.
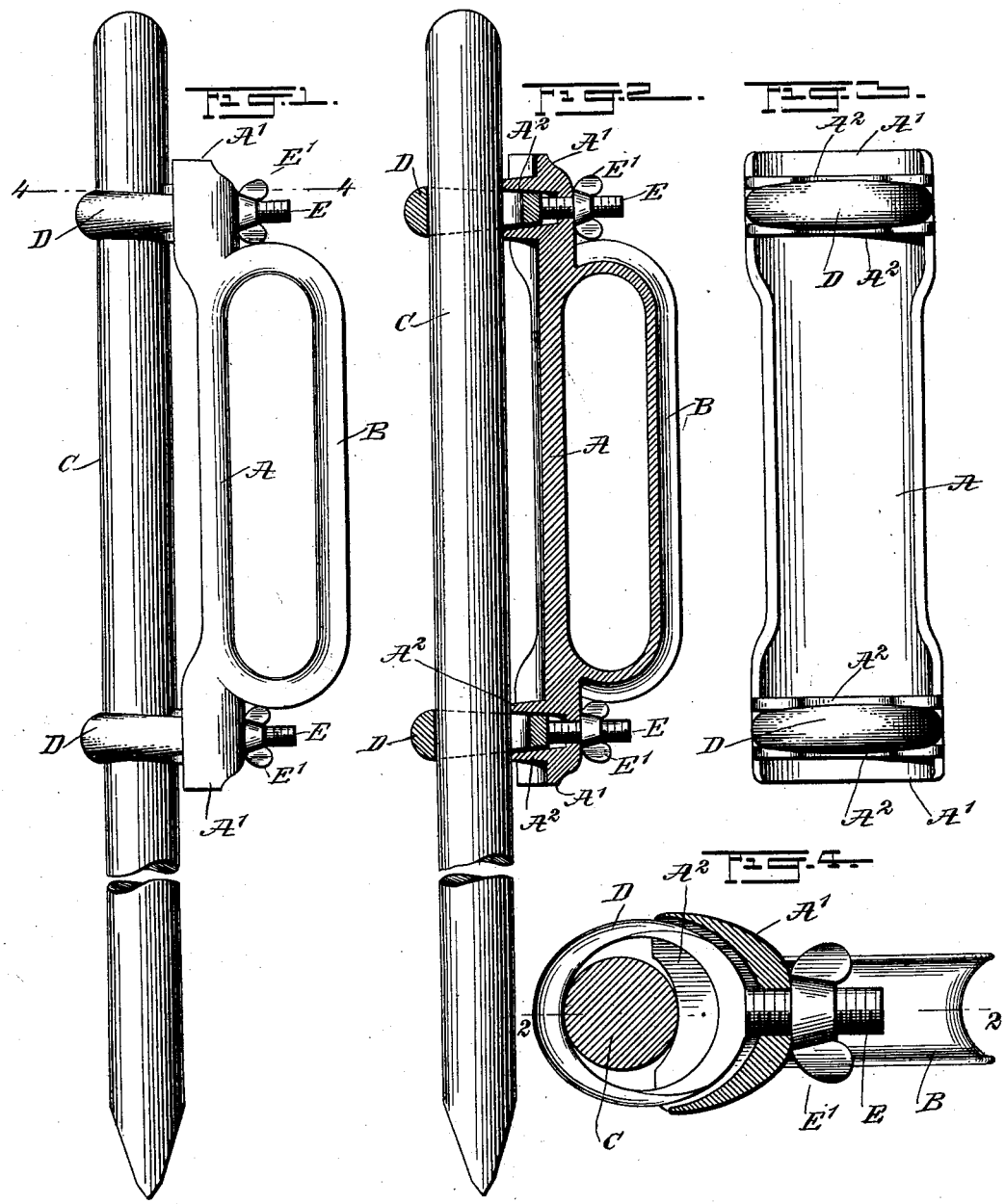
WITNESSES:
INVENTOR
Edward F. Smith
BY
ATTORNEYS No. 758,482.

Patented April 26, 1904.

UNITED STATES PATENT OFFICE.

EDWARD F. SMITH, OF NEWFIELD, MAINE.

HANDLE.

SPECIFICATION forming part of Letters Patent No. 758,482, dated April 26, 1904.

Application filed February 11, 1902. Renewed March 31, 1904. Serial No. 200,954. (No model.)

*To all whom it may concern:*

Be it known that I, EDWARD F. SMITH, a citizen of the United States, and a resident of Newfield, in the county of York and State of Maine, have invented a new and Improved Handle, of which the following is a full, clear, and exact description.

The object of the invention is to provide a new and improved handle designed for use on crowbars, post-hole diggers, and other tools and implements on which a handle may be of temporary or permanent service, the handle being very simple and durable in construction, cheap to manufacture, easily applied or removed, not liable to be injured when in use, and arranged to insure a firm grip.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a side elevation of the improvement as applied. Fig. 2 is a sectional side elevation of the same on the line 2 2 of Fig. 4. Fig. 3 is a rear face view of the handle; and Fig. 4 is an enlarged sectional plan view of the improvement as applied, the section being on the line 4 4 of Fig. 1.

The shank A of the handle B is provided at its ends with extensions A', each of which is formed at its inner face with spaced lugs $A^2$, adapted to abut against one side of the tool or implement C on which the handle is to be used. The implement or tool C is clamped to the lugs by clamping devices consisting, essentially, of eyes D, through which extends the tool or implement C, each eye being held to slide between the pair of lugs $A^2$, and each eye is provided with a bolt E, passing through an aperture in the extension A', as plainly shown in Fig. 2, so that when the nut E' of the bolt E is screwed up against the outer face of the extension A' then the eye D is drawn inward to clamp the tool C firmly against the corresponding lugs $A^2$. Thus by engaging the eyes of the clamping devices with the tool or implement C and then screwing up the nuts E', I cause a firm adjustment of the handle to the tool or implement C at any desired point in the length thereof.

It is understood that by having the eyes D held slidably between the pairs of lugs $A^2$ the eyes cannot turn, and at the same time the eyes firmly draw the tool C in position against the lugs $A^2$, the inner faces of which are preferably convexed, so as to properly fit the corresponding peripheral shape of the tool or implement C on which the handle is used. By loosening the nuts E' the handle can be readily slipped off the tool or implement.

It is understood that the shank B extends a distance from the tool or implement C when the lugs $A^2$ are in direct contact with the tool or implement, together with the eyes D, the openings of which are considerably larger than the outside diameter of the tool or implement.

Having thus described my invention, I claim as new and desire to secure by Letters Patent—

1. A handle for tools, implements and like articles, comprising a shank having lugs at its inner face at or near the ends thereof, and clamping devices adjustable on the shank and engaging the article, to draw the latter tight against the lugs, to clamp the handle in place, as set forth.

2. A handle for tools, implements and like articles, comprising a handle proper, having a shank formed with extensions at its ends, and clamping devices held on the said extensions to clamp the handle in position on the article, as set forth.

3. A handle for tools, implements and like articles, comprising a handle proper, having a shank formed with extensions at its ends, and clamping devices held on the said extensions to clamp the handle in position on the article, each clamping device consisting of an eye and a bolt thereon, engaging the corresponding extension, as set forth.

4. A handle for tools, implements and like articles, comprising a handle proper, having extensions at its ends, each extension being formed with spaced lugs for engagement with one side of the article, and eyes held to slide between a pair of lugs and adapted to engage the article, each eye having a bolt engaging the extension, as set forth.

In testimony whereof I have signed my name to this specification in the presence of two subscribing witnesses.

EDWARD F. SMITH.

Witnesses:
ARTHUR L. HAYES,
JOHN C. HAYES.